United States Patent
Voeller

(10) Patent No.: US 7,099,749 B2
(45) Date of Patent: Aug. 29, 2006

(54) VOICE CONTROLLED VEHICLE WHEEL ALIGNMENT SYSTEM

(75) Inventor: David A. Voeller, Saint Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 154 days.

(21) Appl. No.: 10/784,076

(22) Filed: Feb. 20, 2004

(65) Prior Publication Data

US 2004/0167674 A1    Aug. 26, 2004

Related U.S. Application Data

(60) Provisional application No. 60/448,594, filed on Feb. 20, 2003.

(51) Int. Cl.
*G01B 21/06*    (2006.01)
*G01L 11/00*    (2006.01)

(52) U.S. Cl. ............... 700/279; 33/286; 704/275
(58) Field of Classification Search ........... 700/279; 33/286, 288; 704/275
See application file for complete search history.

(56) References Cited

U.S. PATENT DOCUMENTS

| | | | |
|---|---|---|---|
| 5,305,244 A * | 4/1994 | Newman et al. ............ 708/141 |
| 5,659,620 A | 8/1997 | Kuhlman | |
| 5,692,059 A * | 11/1997 | Kruger ..................... 381/151 |
| 6,085,428 A * | 7/2000 | Casby et al. ............... 33/286 |
| 6,594,370 B1 * | 7/2003 | Anderson .................. 381/315 |
| 2003/0055535 A1 * | 3/2003 | Voeller et al. ............. 700/279 |
| 2003/0191649 A1 * | 10/2003 | Stout et al. ................ 704/275 |

OTHER PUBLICATIONS

Product literature by Nextlink—dspfactory—"News Release" 2 pages Nov. 18, 2002.
Pamphlet —"Air-And Bone-Conductive Integrted Microphones For Robust Speech Detection And Enhancement"—Y. Zheng, Z. Liu, Z. Zhang, M. Sinclair, J. Droppo, L. Deng, A. Acero, and X. Huang — pp. 249-254, Dec. 2003.

* cited by examiner

*Primary Examiner*—Leo Picard
*Assistant Examiner*—Steven R. Garland
(74) *Attorney, Agent, or Firm*—Polster, Lieder, Woodruff & Lucchesi, L.C.

(57) ABSTRACT

An improved vehicle wheel alignment system having a voice interface configured with an induction-pickup microphone associated with an earpiece and adapted to receive voice signals from a vibration transmitting anatomical structure associated with an operator. A central processing unit in the vehicle wheel alignment system is configured with one or more software objects to process received data signals representative of acoustic signals acquired through the induction-pickup microphone to identify one or more spoken commands, and to execute operating instructions associated with the identified spoken commands.

27 Claims, 2 Drawing Sheets

VOICE CONTROLLED VEHICLE WHEEL ALIGNMENT SYSTEM

CROSS-REFERENCE TO RELATED APPLICATIONS

The present application is related to, and claims priority from, U.S. Provisional Patent Application Ser. No. 60/448,594 filed on Feb. 20, 2003.

STATEMENT REGARDING FEDERALLY SPONSORED RESEARCH

Not Applicable.

BACKGROUND OF THE INVENTION

The present invention relates generally to vehicle wheel alignment systems having a computer or central processor configured to receive information from an operator to be utilized in performing a vehicle service, and more particularly, to a vehicle wheel alignment system having a computer or central processor configured to receive operator voice instructions utilizing a contact microphone to reduce ambient noise interference.

Traditional vehicle wheel alignment systems utilize a system controller or central processor, typically a general purpose computer configured with wheel alignment software, which is connected to one or more vehicle wheel alignment angle sensors. General purpose computers, as utilized in vehicle wheel alignment systems typically include a variety of conventional input and output devices, such as keyboards, pointing devices, printers, displays, and audio components. Traditional vehicle wheel alignment sensors comprise sets of angle transducers which are mounted to the wheels of a vehicle undergoing an alignment service, such as shown in U.S. Pat. No. 5,489,983 to McClenahan et al., herein incorporated by reference. Alternatively, vehicle wheel alignment sensors may comprise a camera system designed to observe either the wheels themselves, or targets mounted to the vehicle wheels, to generate images from which alignment angles may be determined, as shown in U.S. Pat. No. 5,870,315 to January, herein incorporated by reference.

In addition to requiring wheel alignment angle information from individual wheel alignment sensors, a wheel alignment system or other vehicle service system central processor requires information identifying the type of sensors which it is utilizing, information related to the vehicle undergoing service, and information identifying the manner and format of any output provided to the operator or technician. These various pieces of information are traditionally entered into the central processor manually, via the conventional input devices such as the keyboard or mouse. During a vehicle wheel alignment procedure, a technician further interacts with the central processor by manually selecting choices presented by the central processor on a display, or by performing actions in response to directions provided on the display.

As manual entry of information and selection of choices can be time consuming and repetitive, it would be advantageous to provide a vehicle wheel alignment system wherein information can be exchanged between the operator or technician and the central processor in a voice form, thereby eliminating the need for the technician or operator to frequently return to the location of the display or manual data entry input devices.

U.S. Pat. No. 6,085,428 to Casby et al. for "Hands Free Automotive Service System" describes a voice control system for an automotive service system including a headset microphone, through which a technician can communicate voice commands to an item of automotive service equipment. Within the automotive service equipment, a speech processor module receives signals from the headset microphone, converts the voice commands into digital instructions which can be processed by a system controller, and additionally converts data from the system controller into synthesized voice for communication to the technician through an audio speaker.

It has been found that the use of a headset having either a single air conducting or air interface microphone is cumbersome to a vehicle service technician who may be frequently required to operate within the confined space underneath a vehicle raised on a lift rack. Further, in an automotive service environment, air conducting or air interface microphones pickup and convey high levels of ambient background noises, such as engine noise, background conversations, and air-operated tools to the automotive service equipment computer, requiring either significant signal processing to extract specific operator voice commands, or numerous repetitions of a single voice command by an operator. Background noises can additionally cause the automotive service equipment to react as if the operator had spoken a voice command when in fact, none had been spoken.

Accordingly, there is a need for a voice interface to a vehicle wheel alignment system which is capable of distinguishing operator spoken voice commands from ambient and transient background noises without the need for an operator to frequently repeat commands, and which does not require extensive signal processing of audio signals to identify a spoken command for association with specific vehicle wheel aligner operating instructions.

BRIEF SUMMARY OF THE INVENTION

Briefly stated, a preferred embodiment of the present invention improves upon vehicle wheel alignment systems having voice interfaces by providing an operator with a communications interface including a contact microphone, and which is adapted to convey operator voice commands received by the contact microphone inductively from an anatomical structure on the operator to the vehicle wheel alignment system. The vehicle wheel alignment system is further configured to process the conveyed voice commands to identify and carry out one or more corresponding operating instructions.

In an alternate embodiment, the present invention improves upon vehicle wheel alignment systems having voice interfaces by providing an operator with a communications interface including a contact microphone adapted to inductively receive low frequency spoken audio signals from an operator, an air interface or air conductive microphone adapted to simultaneously receive wideband spoken audio signals from the operator, and an audio interface module. The audio interface module is adapted to receive as inputs the voice audio signals from the microphones, either in digital or analog form, and to condition the voice audio signals to produce an output data signal representative of the operator's voice with ambient or background noise removed, and without pre-processing or parsing any of the voice audio signals to identify individual spoken commands. The resulting output data signal is sent to the vehicle wheel alignment system. The vehicle wheel alignment system includes one or more software objects configured to process the resulting audio interface module's output data signal to identify the presence of operator spoken words, to identify one or more operator spoken commands, and to carry out one or more corresponding operating instructions.

A method of the present invention for controlling the operation of a vehicle wheel alignment system having a central processor configured to control one or more components includes an initial step of acquiring one or more voice signals from an operator, each of which includes one or more spoken words. The voice signals are subsequently communicated to the central processor, wherein one or more spoken words from an operator corresponding to at least one command are extracted from the communicated voice signals. Finally, the extracted commands are executed at the central processor.

An alternate method of the present invention for controlling the operation of a vehicle wheel alignment system having a central processor configured to control one or more components includes initial steps of inductively acquiring a low frequency voice signal including one or more spoken words from an operator utilizing a contact microphone and simultaneously acquiring a corresponding wideband voice signal utilizing an air interface microphone. The voice signals are subsequently communicated to the central processor, wherein the low frequency voice signal is processed to distinguish the spoken words from ambient and transient background noise, and the corresponding portion of the wideband voice signal is processed to extract one or more commands which are subsequently executed at the central processor.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In the present invention, an automotive service system 10, such as a vehicle wheel alignment system shown in co-pending U.S. patent application Ser. No. 09/955,263, herein incorporated by reference, is configured with a conventional communications interface 12 adapted to receive voice signals for conveyance to a central processing unit 14 or audio interface 15. The present invention will be described in the context of a vehicle wheel alignment system 10, but those of ordinary skill in the art will recognize that the embodiments disclosed herein may be utilized with any of a variety of vehicle service systems.

Figure 1:
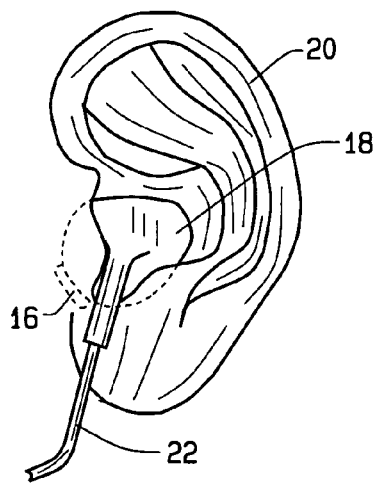
FIG. 1 is a view of a prior art contact microphone and speaker assembly disposed in an operator's left ear.
Figure 2:
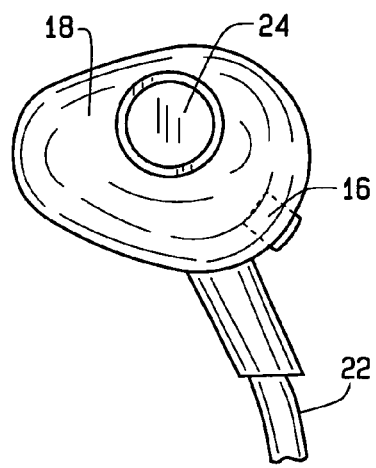
FIG. 2 is a rear view of the prior art contact microphone and speaker assembly of FIG. 1.

Preferably, as shown in FIGS. 1 and 2, the communications interface 12 incorporates a contact microphone 16 disposed in an earpiece 18 placed in the outer portion of an operator's ear 20, or similar device such as a throat band (not shown) with the contact microphone positioned slightly to the left or right of the larynx. The contact microphone 16 is configured to receive voice signals inductively from a vibration transmitting anatomical structure on the operator's body.

As an operator speaks a voice command, the contact microphone 16 inductively picks up associated acoustic signals as vibrations transmitted through the operator's auditory structures, such as a maxillary bone or larynx, and converts the acoustic signals into data signals. These data signals are communicated to the central processing unit 14 or the audio interface 15 through one or more connecting communications pathways 22, such as wires, or wirelessly utilizing a conventional portion of the electromagnetic spectrum. Suitable contact microphones 16, such as those shown in FIG. 1 through FIG. 4, coupled to earpieces 18 for conductive reception of an operator's voice are described in U.S. Pat. No. 5,659,620 to Kuhlman, herein incorporated by reference, and are commercially available from NextLink.TO A/S of Gentofte, Denmark and sold under the Invisio™ brand name.

Figure 3:
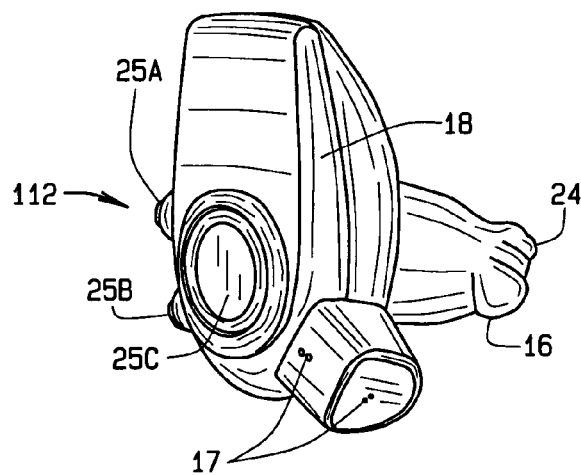
FIG. 3 is a perspective view of a conventional contact microphone and speaker assembly with wireless communications interface adapted for placement in an operator's ear.
Figure 4:
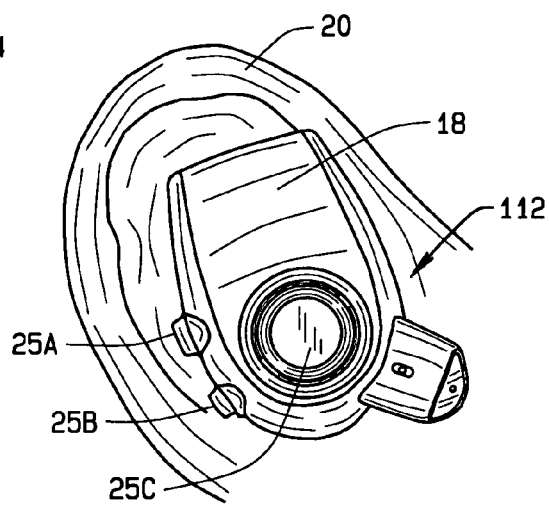
FIG. 4 is a view of a conventional contact microphone and speaker assembly with wireless communications interface of FIG. 3 disposed in an operator's right ear.

As shown in FIGS. 3 and 4, an alternate communications interface 112 including a contact microphone 16, and an optional speaker 24 disposed in the earpiece 18, is in wireless communication with either the central processing unit 14 or audio interface 15 of the vehicle wheel alignment system 10. The communications interface 112 may include one or more external controls 25, such as a volume up/down button 25A and mute button 25B associated with the speaker 24, and a main on/off button 25C.

Wireless communications between the communications interface 12, 112 and the vehicle wheel alignment system 10 preferably utilize the Bluetooth™ communications protocol, but may be by any conventional wireless communications methodology, such as infrared or radio-frequency communications. Preferably the communications interface 12, 112 does not communicate with the central processing unit 14 through a dedicated speech analysis interface card, and voice signals received from the contact microphone 16 are not pre-processed or parsed for individual commands or other predetermined patterns prior to being received at the central processing unit 14.

Figure 5:
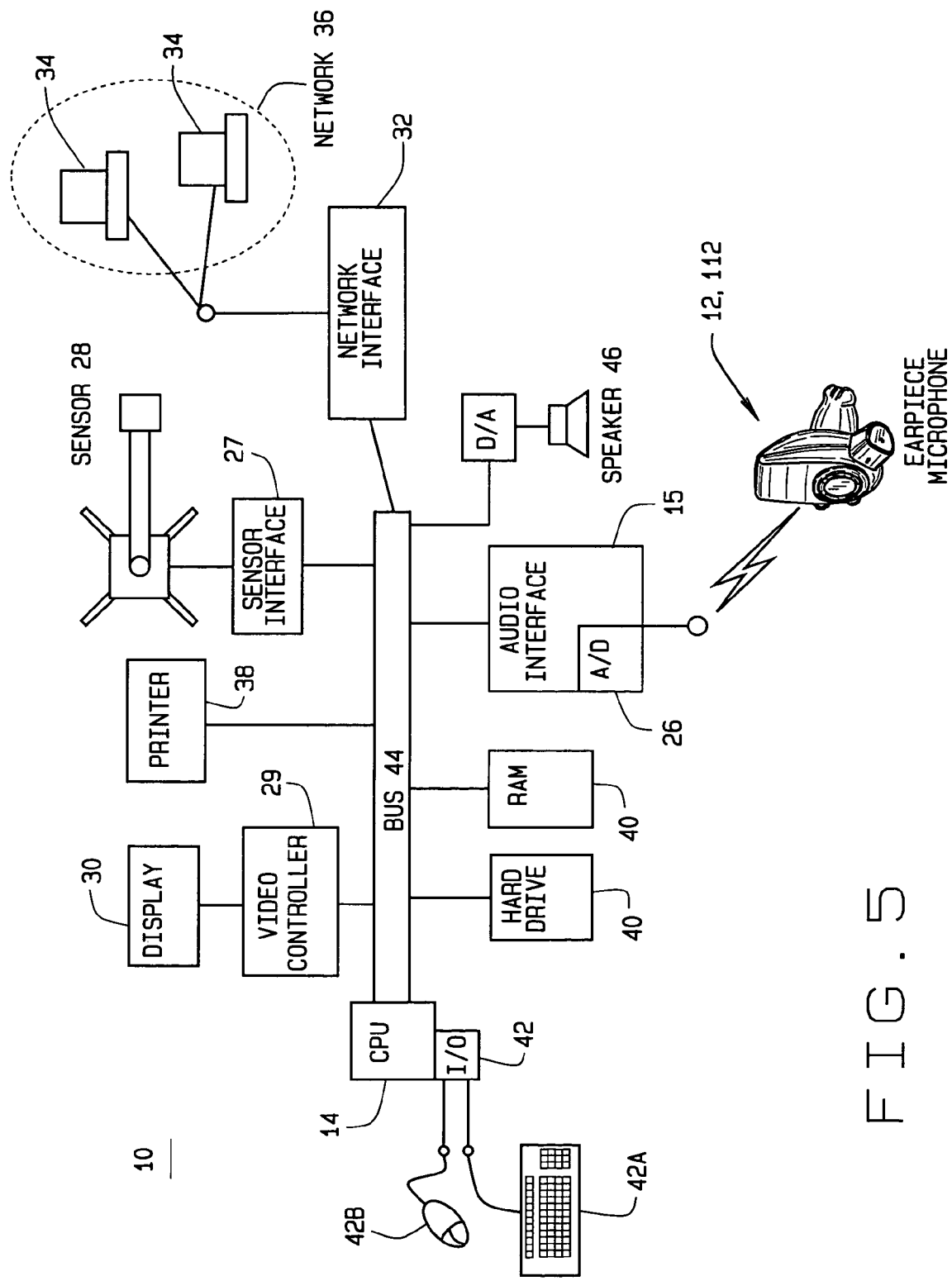
FIG. 5 is a diagrammatic representation of a communications interface of FIG. 3 in wireless communication with a vehicle wheel alignment system.

Those of ordinary skill in the art will recognize that voice signals received in analog form may be converted into digital form by means of conventional analog-to-digital conversion circuits 26 contained either in the audio interface module 15, or in the communications interface 12, 112 without pre-processing or parsing the voice signals to identify individual commands. The audio interface module 15 may either be associated directly with the communications interface 12, 112 or, as illustrated in FIG. 5, may be associated with a micro-processor or logic circuit containing the central processing unit 14 of the wheel alignment system 10.

Ambient noise present in an automotive service environment is unlikely to have sufficient energy to cause transient acoustic vibrations in an operator's jawbone or other vibration transmitting anatomical structures. Hence, preprocessing or filtering of acoustic signals received at the contact microphone 16 to remove transient signals or ambient noise is not required by the preferred embodiment of the present invention.

To further reduce the effects of ambient noise, and reduce the amount of processing required for identification of voice commands in received data signals from the communications interface 12, 112, an alternate embodiment provides an operator with a communications interface 12, 112 including a contact microphone 16 adapted to inductively receive low frequency spoken audio signals from an operator, and one or more air interface or air conductive microphones 17, adapted to simultaneously receive wideband spoken audio signals from the operator, such as shown in FIGS. 3 and 4.

Low frequency spoken audio signals are easily conveyed by an operator's vibration transmitting anatomical structures to the contact microphone 16, while higher frequency transient and ambient noises present in an environment are not. However, low frequency spoken audio signals contain a limited amount of speech signal information, hindering speech processing of the data signals by the central processor 14.

In contrast, wideband spoken audio signals received by the air interface or air conductive microphones 17 include all frequencies of the spoken audio signals as well as higher frequency transient and ambient noises, impeding the ability to identify operator spoken commands while simultaneously including significant speech signal information which may be utilized for speech processing. Hence, a low frequency contact microphone 16 is utilized in an alternate embodiment of the present invention to enhance speech processing by the central processor 14 of data signals from wideband air interface or air conductive microphones 17 by distinguishing operator spoken words from ambient and transient noise present in a data signal acquired by a wideband air interface or air conductive microphone 17.

Communications interfaces 12, 112 configured with one or more air interface or air conductive microphones 17 are further adapted to convey both the low frequency and wideband audio data signals to the vehicle wheel alignment system 10. The central processor 14 or audio interface 15 of the vehicle wheel alignment system 10 includes one or more software objects configured to initially process the conveyed low frequency audio data signals to identify the presence of operator spoken words. Once the presence of an operator spoken word in the conveyed low frequency audio data signal is identified, the software object is further configured to carry out speech processing on corresponding portions of the conveyed wideband audio data signals to identify one or more operator spoken commands, and to carry out one or more associated operating instructions.

Alternatively, received data signals, either in digital or analog form, may be conditioned using conventional spectral subtraction techniques, conventional speech filters, or analyzed by the audio interface module 15 or an associated digital signal processing DSP circuit using conventional techniques to remove ambient or background noise and to clarify voice frequencies, thereby further facilitating parsing and command recognition by the central processing unit 14.

The central processing unit 14 of the vehicle wheel alignment system 10 is preferably configured with one or more software objects. Individual software objects may be adapted to facilitate operation of various components of the vehicle wheel alignment system 10 shown in FIG. 5, such as a sensor interface 27 interpreting data received from alignment angle sensing devices 28, a video controller 29 directing the display of information to a display 30, or a network interface 32 communicating with external systems 34 such as over a data network 36. Additional conventional software objects are provided for interfacing various hardware components, such as printers 38, data storage devices 40, conventional input/output components 42, which may include a keyboard 42A or a pointing device 42B, and one or more interconnecting data busses 44.

At least one software object configured for operation in the central processing unit 14 is adapted to process acoustic data signals received from the communications interface 12, 112 to identify one or more spoken commands, instructions, or predetermined phrases contained within the voice input signal. The voice input processing software module is adapted to identify predetermined individual words or phrases contained in the acoustic data signals, and to provide the central processing unit 14 or resident software applications with one or more commands or instructions associated with said predetermined individual words or phrases. The central processing unit 14 is further configured to either execute the received commands or instructions, or to convey one or more suitable instructions to an appropriate resident software applications or peripheral component such as a sensor 28 of the vehicle wheel alignment system 10.

A method of the present invention for controlling the operation of the vehicle wheel alignment system 10 includes an initial step of acquiring one or more voice signals from an operator, each of which includes one or more spoken words. The voice signals are subsequently communicated to the central processor 14 as acoustic data signals, wherein one or more spoken words from the operator corresponding to at least one command are extracted from the communicated signals. Finally, the extracted commands are executed at the central processor 14.

An alternate method of the present invention for controlling the operation of the vehicle wheel alignment system 10 includes the initial steps of inductively acquiring a low frequency voice signal including one or more spoken words from an operator utilizing a contact microphone 16, and simultaneously acquiring a corresponding wideband voice signal utilizing an air interface microphone 17. The voice signals are subsequently communicated to the central processor 14 or audio interface 15, wherein the low frequency voice signal is processed to distinguish the spoken words from ambient and transient background noise, and the corresponding portion of the wideband voice signal is processed to extract one or more commands which are subsequently executed at the central processor.

In one embodiment, the software objects with which the central processing unit 14 is configured utilizes the VoiceXML (Voice extensible Markup Language) standard to identify commands, instructions, or predetermined phrases contained in the received acoustic data signals, and to provide the central processing unit 14 with one or more commands or instructions associated with the acoustic data signal processed commands, instructions, or predetermined phrases. The VoiceXML standard provides a framework around which acoustic data signal processing is performed, establishing standard input and output protocols, event handling (such as intelligible voice signals, requests for help, etc), and communications. VoiceXML is adapted to work in conjunction with internet browser based applications to provide voice interfaces, the use of VoiceXML is particularly suited for vehicle wheel alignment applications wherein the central processing unit 14 is configured with an Internet browser-based user interface for processing and/or displaying vehicle wheel alignment information.

With a central processing unit 14 of the vehicle wheel alignment system 10 configured in this manner, an operator can direct the operation of the vehicle wheel alignment system 10 using spoken voice commands as input, eliminating the need to manually enter commands via the keypad 42A, pointing device 42B, or other input device. For example, an operator speaking normally will convey auditory signals to the contact microphone 16, and may state individual commands such as "BEGIN", "STOP", "CONTINUE", "SELECT", "NEXT" or "DISPLAY". Alternatively, the operator could direct a command to the vehicle wheel alignment system 10 in the form of a phrase, such as "DISPLAY ALIGNMENT VIDEO", "BEGIN RUNOUT COMPENSATION", "READ INSTRUCTIONS", "ACQUIRE MEASUREMENTS", or "DISPLAY ALIGNMENT SPECIFICATIONS". Those of ordinary skill in the art will recognize that there is a wide range of individual commands and phrases with which the voice input software module can be configured to identify from an acoustic data signal.

Optionally, an operator may be required to preface voice commands with a specific "wake-up" or trigger word. The trigger word is then followed by a spoken instruction. For example, the phrase "ALIGNER, DISPLAY ALIGNMENT SPECIFICATIONS" may be utilized to instruct the vehicle wheel alignment system 10 to provide the operator with a display of alignment specifications. Using this conventional format for delivery of voice commands to a vehicle wheel alignment system 10, the operator is required to preface each command with the "wake-up" or trigger word. The purpose of the "wake-up" or trigger word is to prevent the vehicle wheel alignment system 10 from interpreting portions of non-command conversations carried out within the audio pickup range of the vehicle wheel alignment system 10 as spoken commands.

In one embodiment of the present invention, to facilitate the recognition of individual voice commands by the central processing unit 14, the set of predefined commands and phrases may be selected such that each command or phrase is phonetically distinct. The use of phonetically distinct voice commands and phrases reduces the possibility of one command or phrase being incorrectly interpreted by the central processing unit 14 as another command which sounds phonetically similar. A further reduction in the occurrence of incorrect command interpretations may be achieved by utilizing command words or phrases which are not part of everyday speech, thereby eliminating the requirement for a "wake-up" or trigger word to preface every spoken command.

It is preferred that each predetermined individual command or phrase is associated with at least one command, instruction, or sequence of instructions which is then communicated to the central processing unit 14 by the voice input software module upon identification of the corresponding individual command or phrase. The associated commands or instructions may be context sensitive, such that a voice command received during one operational phase of a wheel alignment procedure will result in the central processing unit 14 performing a first function, while the same voice command received during a second operational phase will result in the central processing unit 14 performing a second function. Operational context or operational state information may be stored in a memory 40 accessible by the central processing unit 14, and retrieved as is required upon receipt of a command or instruction from the voice input software object.

For example, a table stored in the memory 40 may identify one or more operational states or contexts, with associated functions identified for each, in which a voice command may be received. If a voice command is received by the vehicle wheel alignment system 10 in an operational state or context where such a command is inappropriate or a response is not defined, the central processing unit 14 may be configured to respond with an error message to the operator, identifying the nature of the error or requesting clarification of the received command.

In an alternate embodiment, the central processing unit 14 of the vehicle wheel alignment system 10 is configured with a voice output software object adapted to generate voice signals for output to an operator through one or more speakers 24, 46 or similar audio output devices, such as may be disposed in the communications interface 12. The central processing unit 14 utilizes the voice output software object to convey information or instructions to an operator in conjunction with information conveyed in a traditional manner on the display 30, or independently thereof. For example, the voice output software object may be adapted to generate voice identifying one or more alignment angle measurements as calculated by the central processing unit 14.

Those of ordinary skill in the art will readily recognize that the voice input software object and the voice output software object may internally consist of a plurality of sub-component software objects, or may be combined in the form of a single voice processing software module capable of processing both input acoustic data signals and output voice signals.

The present invention can be embodied in-part in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. An improved vehicle wheel alignment system having a central processing unit for controlling the operation of the vehicle wheel alignment system, the improvement comprising:
   a communications interface including at least one contact microphone adapted to receive at least one acoustic signal from a vibration transmitting anatomical structure associated with an operator, said at least one contact microphone is configured to produce a data signal representative of said at least one received acoustic signal for communication to said central processing unit;
   wherein said central processing unit is configured to receive said data signal, and to process said data signal to identify at least one discrete spoken command, said central processing unit further configured with at least one software object which conforms to VoiceXML standards to process said data signal to identify said at least one discrete spoken command; and
   wherein the central processing unit is configured responsive to said software object to control the operation of at least one component of the wheel alignment system in response to said identified at least one discrete spoken command.

2. The improved vehicle wheel alignment system of claim 1 wherein said vibration transmitting anatomical structure is adjacent said operator's ear, and said at least one contact microphone disposed in skin contact adjacent said operator's ear.

3. The improved vehicle wheel alignment system of claim 1 wherein said vibration transmitting anatomical structure is adjacent said operator's larynx, and said at least one contact microphone disposed in skin contact with said operator's throat.

4. The improved vehicle wheel alignment system of claim 1 wherein said one or more discrete spoken commands each include a predetermined preface.

5. The improved vehicle wheel alignment system of claim 1 wherein each of said one or more discrete spoken commands are phonetically distinct.

6. An improved vehicle wheel alignment system having a central processing unit for controlling the operation of the vehicle wheel alignment system, the improvement comprising:
   a communications interface including at least one contact microphone adapted to receive at least one acoustic signal from a vibration transmitting anatomical structure associated with an operator, said at least one contact microphone configured to produce a data signal representative of said at least one received acoustic signal for communication to said central processing unit via a wireless communications link conforming to a Bluetooth™ communication protocol; and
   wherein said central processing unit is configured to receive said data signal for processing to identify at least one discrete spoken command.

7. The improved vehicle wheel alignment system of claim 6 wherein said communications interface is further configured to receive an output signal from said central processing unit; and wherein said communications interface further includes at least one speaker configured to convert said received output signal to an audio signal.

8. The improved vehicle wheel alignment system of claim 7 wherein said output signal includes audio data associated with a vehicle wheel alignment procedure.

9. The improved vehicle wheel alignment system of claim 6 wherein said at least one contact microphone is further configured with an acoustic filter, said acoustic filter configured to filter said acoustic signals.

10. The improved vehicle wheel alignment system of claim 9 wherein said acoustic filter is configured responsive to vocal acoustic signals.

11. The improved vehicle wheel alignment system of claim 9 wherein an actuating switch is associated with said acoustic filter.

12. The improved vehicle wheel alignment system of claim 6 wherein said communications interface further includes at least one air conductive microphone adapted to receive one or more acoustic signals through an air interface, said at least one air conductive microphone configured to produce a second data signal representative of said one or more acoustic signals for communication to said central processing unit.

13. The improved vehicle wheel alignment system of claim 12 wherein said at least one contact microphone is adapted to acquire low frequency acoustic signals; and wherein said at least one air conductive microphone is adapted to acquire wideband acoustic signals.

14. The improved vehicle wheel alignment system of claim 6 wherein said communications interface is wearable by an operator.

15. The improved vehicle wheel alignment system of claim 14 wherein said communications interface is incorporated within a headset.

16. An improved vehicle wheel alignment system having a central processing unit for controlling the operation of the vehicle wheel alignment system, the improvement comprising:
   a communications interface including at least one contact microphone adapted to receive at least one acoustic signal from a vibration transmitting anatomical structure associated with an operator, said at least one contact microphone configured to produce a first data signal representative of said at least one received acoustic signal for communication to said central processing unit, said communications interface further including at least one air conductive microphone adapted to receive at least one acoustic signal through an air interface, said at least one air conductive microphone configured to produce a second data signal representative of said at least one acoustic signal received through said air interface for communication to said central processing unit;
   wherein said central processing unit is configured to receive said data signal for processing to identify at least one discrete spoken command, said central processing unit configured with at least one software object adapted to process said first data signal to identify the presence of operator speech;
   wherein said software object is further adapted to process a corresponding portion of said second data signal responsive to an identified presence of operator speech to identify one or more spoken commands; and
   wherein the central processing unit is further configured responsive to said software object to control the operation of at least one component of the wheel alignment system in response to said identified one or more spoken commands.

17. The improved vehicle wheel alignment system of claim 16 wherein said at least one software object conforms to VoiceXML standards.

18. The improved vehicle wheel alignment system of claim 16 wherein said one or more discrete spoken commands each include a predetermined preface.

19. The improved vehicle wheel alignment system of claim 16 wherein each of said one or more discrete spoken commands are phonetically distinct.

20. The improved vehicle wheel alignment system of claim 16 wherein said communications interface is further configured to communicate at least one of said first and second data signals to the central processing unit via a wireless communications link.

21. An improved vehicle wheel alignment system having a central processing unit for controlling the operation of the vehicle wheel alignment system, the improvement comprising:
  a communications interface including at least one contact microphone adapted to receive one or more acoustic signals from a vibration transmitting anatomical structure adjacent said operator's larynx, said at least one contact microphone is disposed in skin contact with said operator's throat and is configured to produce a first signal representative of said received acoustic signals;
  at least one air conductive microphone adapted to receive one or more acoustic signals through an air interface, said at least one air conductive microphone configured to produce a second signal representative of said received acoustic signals;
  an audio processor module configured to receive said first and second signals and to provide an output data signal representative of voice input to said central processing unit.

22. The improved vehicle wheel alignment system of claim 21 wherein said audio processor module is further adapted to utilize said first signal and said second signal to clarify voice data received from an operator.

23. The improved vehicle wheel alignment system of claim 21 wherein said output data signal is representative of said clarified voice data.

24. The improved vehicle wheel alignment system of claim 21 wherein said improvement further comprises the central processing unit configured with at least one software object adapted to process said output data signal to identify one or more discrete spoken commands; and
  wherein the central processing unit is configured responsive to said software object to control the operation of at least one component of the wheel alignment system in response to said identified one or more spoken commands.

25. The improved vehicle wheel alignment system of claim 21 wherein said communications interface is further configured to communicate said output data signal to the central processing unit via a wireless communications link.

26. The improved vehicle wheel alignment system of claim 21 wherein said communications interface is further configured to receive an output signal from said central processing unit; and wherein said communications interface further includes at least one speaker configured to convert said received output signal to an audio signal.

27. The improved vehicle wheel alignment system of claim 26 wherein said output signal includes audio data associated with a vehicle wheel alignment procedure.

* * * * *